United States Patent [19]

Yamakawa et al.

[11] Patent Number: 4,630,704
[45] Date of Patent: Dec. 23, 1986

[54] SYSTEM FOR CONTROLLING A POWER TRANSMISSION OF A FOUR-WHEEL DRIVE VEHICLE

[75] Inventors: Toru Yamakawa; Fujio Makita, both of Hachioji; Mitsuo Umezawa; Ryuzo Sakakiyama, both of Tokyo, all of Japan

[73] Assignee: Fuji Jukogyo Kabushiki Kaisha, Tokyo, Japan

[21] Appl. No.: 651,557

[22] Filed: Sep. 17, 1984

[30] Foreign Application Priority Data

Sep. 20, 1983 [JP] Japan ................... 58-173595

[51] Int. Cl.⁴ ............................ B60K 23/08
[52] U.S. Cl. ........................... 180/247; 180/233
[58] Field of Search .............. 180/233, 247; 74/335; 192/85 R

[56] References Cited

U.S. PATENT DOCUMENTS 4,417,641 11/1983 Kageyama .................. 180/247
4,551,014 4/1985 Makita ....................... 180/233

FOREIGN PATENT DOCUMENTS 26634 2/1983 Japan ........................ 180/247
56919 4/1983 Japan ........................ 180/247

Primary Examiner—Albert W. Davis, Jr.
Attorney, Agent, or Firm—Martin A. Farber

[57] ABSTRACT

A system for controlling a power transmission of a four-wheel drive vehicle powered by an engine has a transmission for transmitting the power of the engine to main driving wheels of the four-wheel drive vehicle, a hydraulically operated clutch for transmitting the power to auxiliary driving wheels, a hydraulic circuit for operating the clutch in accordance with driving conditions. The system comprises a sensor for detecting the inclination of roads and for producing an output signal dependent on the inclination, and a control circuit responsive to the output signal from the sensor for engaging the clutch when the output signal exceeds a predetermined value, thereby establishing the four-wheel drive.

4 Claims, 5 Drawing Figures

4,630,704

SYSTEM FOR CONTROLLING A POWER TRANSMISSION OF A FOUR-WHEEL DRIVE VEHICLE

BACKGROUND OF THE INVENTION

The present invention relates to a system for a four-wheel drive vehicle for automatically changing the transmission system of the vehicle from two-wheel drive to four-wheel drive in accordance with the inclination of roads.

In a conventional four-wheel drive vehicle, a power transmission system for the two-wheel driving is selectively converted to the four-wheel driving system by engaging a clutch which is manually operated by a select lever.

For example, when the vehicle travels on slippery roads by two-wheel driving, the transmission system should be changed to the four-wheel drive system in order to prevent wheels from slipping. If the changing operation is done after the slipping because of driver's misjudgement of the slipping, the slipping cannot be stopped or reduced.

In order to resolve such a problem, an automatic control system for the four-wheel drive system has been proposed. A conventional system is provided with a slip detecting circuit which produces a clutch signal when the difference between speed of the front and rear wheels exceeds a predetermined reference value. The clutch signal causes a clutch to engage, so that the two-wheel drive is automatically changed to the four-wheel drive.

However, the four-wheel driving is also useful to drive the vehicle uphill and downhill.

Great driving force by the four-wheel driving is effective at uphill driving. In addition, since the engine braking acts on all wheels, the vehicle can be safely driven downhill by the four-wheel driving.

SUMMARY OF THE INVENTION

Therefore, the object of the present invention is to provide a power transmission control system which operates to automatically change two-wheel driving to four-wheel driving in accordance with the inclination of the uphill and downhill.

According to the present invention, there is provided a system for controlling a power transmission of a four-wheel drive vehicle powered by an engine having a transmission for transmitting the power of the engine to main driving wheels of said four-wheel drive vehicle, a clutch for transmitting the power to auxiliary driving wheels second sensor for detecting the speed of the vehicle and for producing a speed output signal dependent on the speed, circuit means for operating the clutch in accordance with driving conditions. The system comprises a first sensor for detecting the inclination of roads and for producing an inclination output signal dependent on the inclination, control means responsive to the output signals from the first said second sensor for engaging the clutch when the speed output signal is smaller than a predetermined speed signal which is decided by the inclination of the road.

In an aspect of the present invention, the clutch is a hydraulically operated clutch, and the circuit means comprises a hydraulic circuit for operating the clutch. The hydraulic circuit has a solenoid operated valve for controlling a fluid supplied to the clutch.

The other objects and features of this invention will be apparently understood from the following description with reference to the accompanying drawings.

DETAILED DESCRIPTION OF THE PREFERRED EMBODIMENTS

Figure 1:
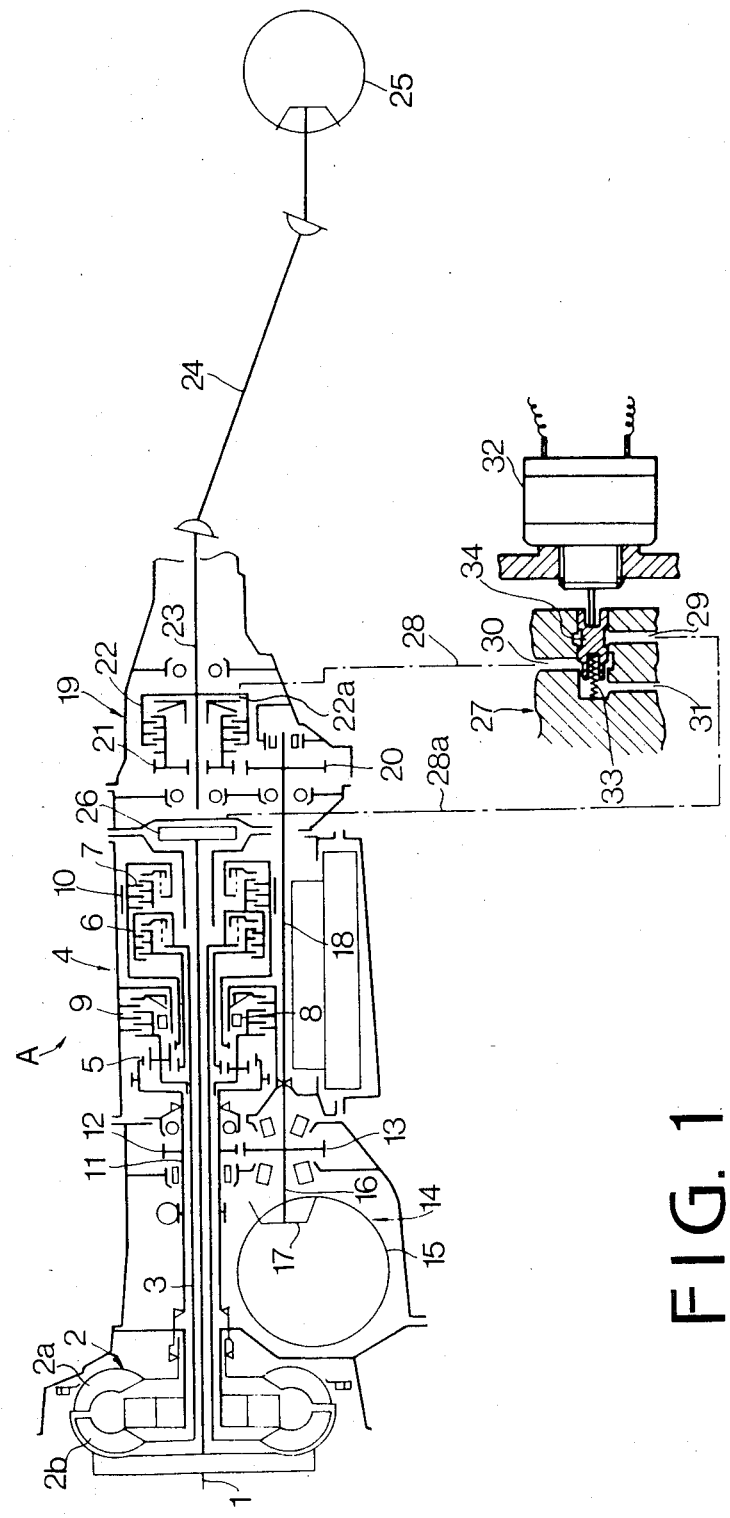
FIG. 1 is a schematic view showing an automatic transmission to which a control system according to the present invention is used.

Referring to FIG. 1, a crankshaft 1 of an internal combustion engine (not shown) mounted on a front portion of a vehicle is operatively connected with a torque converter 2 of an automatic transmission A.

The automatic transmission A comprises the torque converter 2, an automatic transmission device 4, and a final reduction device 14 for front wheels (not shown) of the vehicle.

The torque converter 2 comprises a pump impeller 2a and a turbine 2b. The pump impeller 2a is connected with the engine crankshaft 1. A turbine shaft 3 is extended from the turbine 2b to the automatic transmission device 4.

The automatic transmission device 4 comprises a planetary gear 5, clutches 6 and 7 for selectively transmitting the output of the turbine shaft 3 to the planetary gear 5, a one-way clutch 8, a brake 9 and brake band 10 for selectively locking elements of the planetary gear 5.

The output of the automatic transmission device is transmitted to an output shaft 11 on which a drive gear 12 is securely mounted and which in turn engages with a driven gear 13. The driven gear 13 is securely mounted on a shaft 16, on one end of which a drive pinion 17 is formed. The drive pinion 17 engages with a crown gear 15 of a final reduction device 14 for the front wheels. The other end of the shaft 16 is connected to a transfer drive shaft 18 which extends rearwardly and is connected to a first transfer gear 20 of a transfer device 19. The first transfer gear 20 is engaged with a second transfer gear 21. The second transfer gear 21 is rotatably mounted on a rear drive shaft 23. A pressure oil operated friction clutch 22 of the multiple-disk type is mounted on the rear drive shaft 23 for engaging the gear 21 with the shaft 23. The rear drive shaft 23 is further operatively connected to a final reduction device 25 for rear wheels (not shown) of the vehicle through a propeller shaft 24.

A pressure chamber 22a of the clutch 22 is communicated with an oil pump 26 through a passage 28, solenoid-operated changeover valve 27 and passage 28a. The changeover valve 27 has an inlet port 29 connected to the oil pump 26, an outlet port 30 connected to the pressure chamber 22a, and a drain port 31.

A spool 34 is operatively connected to a solenoid 32 and biased by a spring 33 to the right. When the solenoid 32 is de-energized, the spool 34 is urged by the spring 33 to close the inlet port 29 and to communicate the outlet port 30 to the drain port 31 as shown in FIG. 1. By draining the pressure chamber 22a, the clutch 22 disengages. When the solenoid 32 is energized, the spool 34 is shifted to the left to close the drain port 31 and to communicate the pressure chamber 22a with the oil pump 26 through the passage 28, ports 30, 29 and passage 28a. Thus, the clutch 22 engages, thereby connecting the gear 21 with the shaft 23 to establish a four-wheel drive power transmission.

Figure 2:
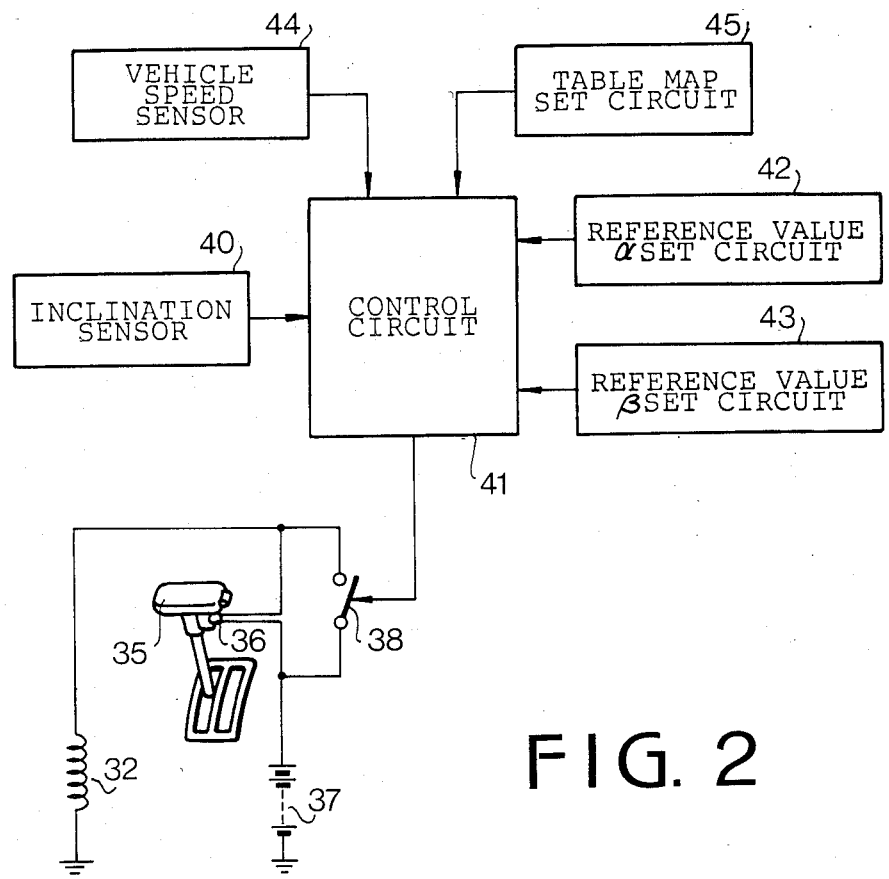
FIG. 2 is a diagram showing an electric circuit provided in the system of the present invention.

Referring to FIG. 2, a manual switch 36 is mounted on a select lever 35 of the automatic transmission device 4 and electrically connected between the solenoid 32 and a battery 37 in series. Further, an electrically operated switch 38 is connected to the manual switch 36 in parallel. Thus, the solenoid 32 is energized by closing the switch 36 or 38 to establish the four-wheel drive.

An inclination sensor 40 is provided to detect the inclination of the body of the vehicle to produce a positive output signal in the upward position on an uphill and a negative output signal in the downward position on a downhill. The output of the sensor 40 is fed to a control circuit 41. The control circuit 41 operates to compare the output signal from the inclination sensor 40 with a reference value $\alpha$ applied from a reference value set circuit 42 at uphill driving and with a reference value $\beta$ applied from a reference value set circuit 43 at downhill driving.

Figure 3:
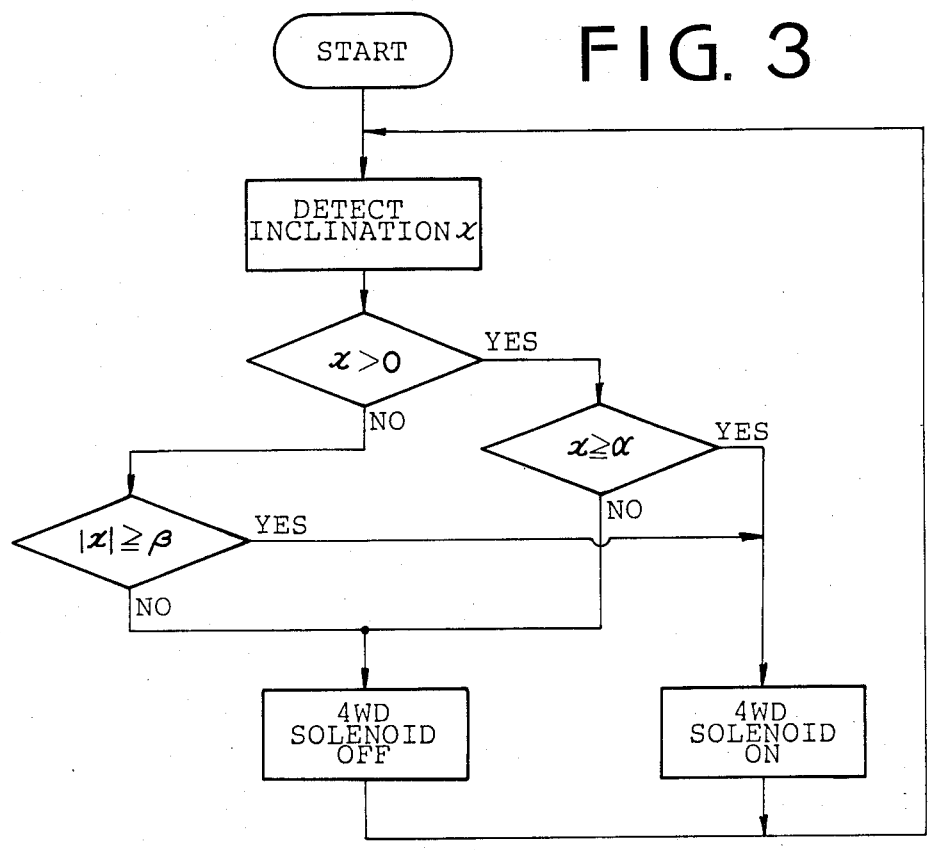
FIG. 3 is a flow chart.

The operation of the system is described hereinafter with reference to FIG. 3. The inclination $\chi$ is detected by the sensor 40. When the value $\chi$ is positive, it is compared with the reference value $\alpha$, and when negative, compared with the reference value $\beta$. If the inclination $\chi$ is larger than the reference $\alpha$ or $\beta$, the control circuit 41 produces an output signal which is applied to the switch 38 to close it. Thus, the two-wheel drive power transmission is automatically changed to the four-wheel drive in dependence on the inclination of the road.

Figure 4:
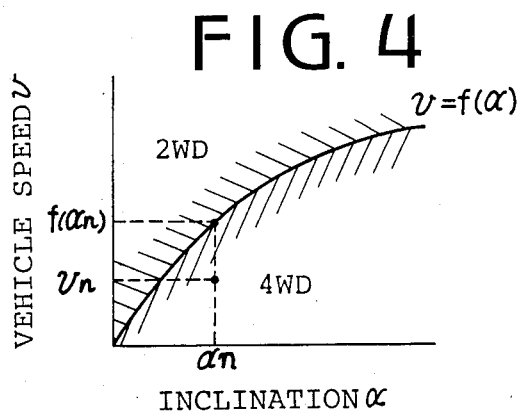
FIG. 4 is a graph showing a range of the four-wheel driving in accordance with the relationship between inclination and vehicle speed.

Describing another embodiment of the present invention, the system of the embodiment is adapted to change the transmission system in accordance with the inclination of the road together with vehicle speed. In the system, a vehicle speed sensor 44 and a table map set circuit 45 are provided as shown in FIG. 2. The table map is shown in FIG. 4. Generally, the driver drives the vehicle at high speed on dry surfaces of roads, because slipping of wheels does not occur on such roads. Accordingly, it is not necessary to change the two-wheel drive to the four-wheel drive at high speed which is dependent on the inclination of the road. The table map of FIG. 4 shows a range for the four-wheel drive in dependency on the inclination and vehicle speed.

Figure 5:
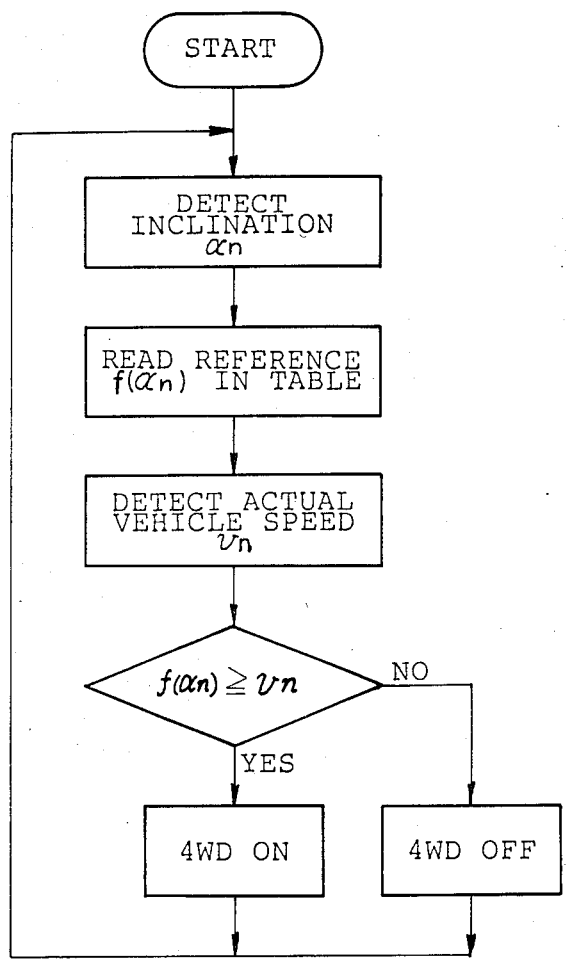
FIG. 5 is a flow chart showing another embodiment of the present invention.

Explaining the operation of the system with reference to FIG. 5 showing a flow chart, in accordance with an inclination $\alpha\eta$ detected by the inclination sensor 40, a limit value $v = f(\alpha\eta)$ is read out from the table map. Then, the actual vehicle speed $v\eta$ is compared with the limit value $v$. When the vehicle speed $v\eta$ is smaller than the limit value $v$, which means the vehicle may be driven on slippery roads at a low speed, the control circuit 41 produces an output signal to provide the four-wheel drive.

In the system, other driving conditions such as the difference between speed of the front and rear wheels may be used for controlling the power transmission system.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In an improved system for controlling a power transmission of a four-wheel drive vehicle powered by an engine having a transmission for transmitting the power of said engine to main driving wheels of said four-wheel drive vehicle, a clutch for transmitting the power to auxiliary driving wheels, second sensor for detecting the speed of the vehicle and for producing a speed output signal dependent on the speed, circuit means for operating said clutch in accordance with driving conditions, wherein the improvement comprises a first sensor for detecting the inclination of roads and for producing an inclination output signal dependent on the inclination, and said circuit means includes control means responsive to said output signals from said first sensor and said second sensor for engaging said clutch when said speed output signal is smaller than a predetermined speed signal which is decided by the inclination of the road.

2. The system according to claim 1 wherein said clutch is a hydraulically operated clutch, and said circuit means comprises a hydraulic circuit having a solenoid operated valve for controlling a fluid applied to the clutch.

3. In a system for controlling power transmission of a four-wheel drive vehicle powered by an engine having a transmission for transmitting the power of said engine to main driving wheels of said four-wheel drive vehicle, a clutch for transmitting the power to auxiliary driving wheels of said four-wheel drive vehicle simultaneously with the transmitting of the power of said engine to the main driving wheels, a sensor for detecting the speed of the vehicle and for producing a speed output signal dependent on the speed, control means for operating said clutch in accordance with driving conditions, the improvement comprising sensor means for detecting respective inclinations of roads, means providing respective predetermined speed signals as a function of the respective inclinations of the road, and said control means for operating said clutch to provide the four-wheel drive when said speed output signal is smaller than said predetermined speed signal.

4. The system according to claim 3, wherein said function is represented by a curve such that said predetermined speed signals have values increasing with increasing inclinations of the road.

* * * * *